US006618798B1

(12) United States Patent
Burton et al.

(10) Patent No.: US 6,618,798 B1
(45) Date of Patent: Sep. 9, 2003

(54) METHOD, SYSTEM, PROGRAM, AND DATA STRUCTURES FOR MAPPING LOGICAL UNITS TO A STORAGE SPACE COMPRISES OF AT LEAST ONE ARRAY OF STORAGE UNITS

(75) Inventors: David Alan Burton, Vail, AZ (US); Robert Louis Morton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/613,681

(22) Filed: Jul. 11, 2000

(51) Int. Cl.[7] ............................................. G06F 12/00
(52) U.S. Cl. ..................... 711/202; 711/114; 711/112; 714/7; 714/3
(58) Field of Search ................................ 711/202, 112, 711/114; 714/7, 3

(56) References Cited

U.S. PATENT DOCUMENTS

| 5,095,420 A | * | 3/1992 | Eilert et al. ................... 711/209 |
| 5,140,592 A | * | 8/1992 | Idleman et al. .................. 714/5 |
| 5,166,939 A | * | 11/1992 | Jaffe et al. .................... 714/766 |
| 5,274,645 A | * | 12/1993 | Idleman et al. .................. 714/6 |
| 5,615,345 A | | 3/1997 | Wanger ........................ 395/309 |
| 5,634,111 A | | 5/1997 | Oeda et al. ................... 395/480 |
| 5,787,242 A | | 7/1998 | DeKoning et al. ..... 395/182.03 |
| 5,809,224 A | * | 9/1998 | Schultz et al. .................. 714/7 |
| 5,809,279 A | | 9/1998 | Oeda et al. ................... 395/480 |
| 5,812,754 A | | 9/1998 | Lui et al. ................ 395/182.04 |
| 5,867,736 A | | 2/1999 | Jantz ........................... 395/894 |
| 5,895,493 A | | 4/1999 | Gatica ......................... 711/147 |
| 5,925,120 A | | 7/1999 | Arp et al. ..................... 710/131 |
| 5,933,824 A | | 8/1999 | DeKoning et al. .............. 707/8 |
| 5,937,435 A | * | 8/1999 | Dobbek et al. .............. 711/202 |
| 5,941,972 A | | 8/1999 | Hoese et al. ................. 710/129 |
| 5,954,796 A | | 9/1999 | McCarty et al. ............. 709/222 |
| 5,959,994 A | | 9/1999 | Bogg et al. .................. 370/399 |
| 5,960,451 A | * | 9/1999 | Voigt et al. .................. 711/114 |
| 5,973,690 A | * | 10/1999 | Ofer et al. ................... 345/803 |
| 6,058,489 A | * | 5/2000 | Schultz et al. .................. 714/7 |
| 6,223,269 B1 | * | 4/2001 | Blumenau .................... 711/202 |
| 6,329,985 B1 | * | 12/2001 | Tamer et al. ................ 345/853 |

OTHER PUBLICATIONS

Distante et al., "A General Index Mapping Technique for Array Reconfiguration," pp 559–563, IEEE, 1988.*

* cited by examiner

Primary Examiner—Matthew Kim
Assistant Examiner—Stephen Elmore
(74) Attorney, Agent, or Firm—David W. Victor; Konrad Raynes Victor & Mann

(57) ABSTRACT

Disclosed is a method, system, program, and data structures for mapping logical units, such as logical unit numbers (LUNs), to a storage space comprised of at least one array of storage units, e.g., hard disk drives. Configuration information stored in one array indicating a first mapping of logical units to storage locations in the array is read. A second mapping of logical units to storage locations in multiple arrays is generated using the configuration information read from the array. Each logical unit is assigned to only one of the arrays.

38 Claims, 6 Drawing Sheets

FIG. 2
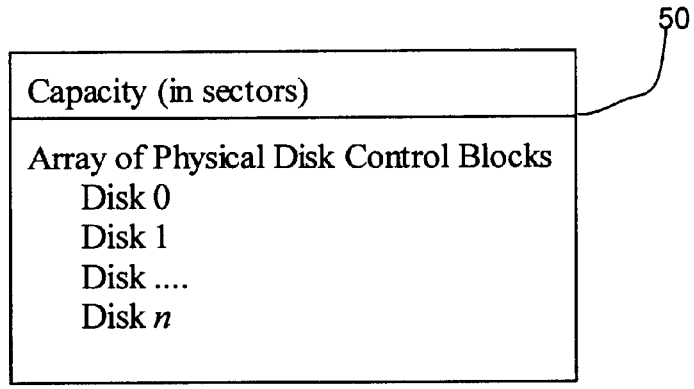
Array Control Block (ACB)
FIG. 3
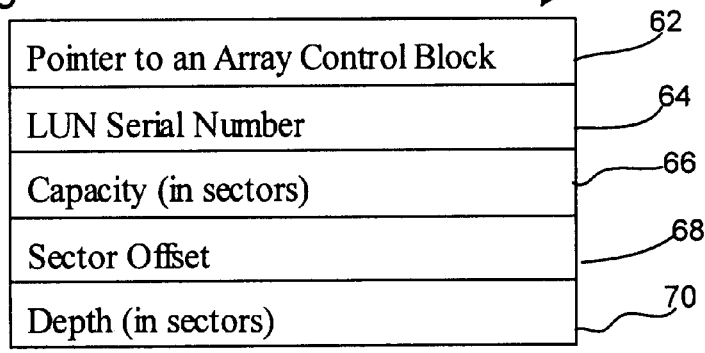
Logical Disk Control Block (LDCB)
FIG. 4
| LUN Number | Pointer to LDCB |
|---|---|
| LUN 0 | LDCB xx |
| LUN 1 | LDCB xxx |
| ..... | ..... |
| LUN m | LDCB FFF |
LUN Mapping Array Global LUN Mapping Array

METHOD, SYSTEM, PROGRAM, AND DATA STRUCTURES FOR MAPPING LOGICAL UNITS TO A STORAGE SPACE COMPRISES OF AT LEAST ONE ARRAY OF STORAGE UNITS

CROSS-REFERENCE TO RELATED APPLICATIONS

This application is related to the following co-pending and commonly-assigned patent application entitled "Method, System, And Program For Expanding the Storage Space in an Array of Storage Units" to Robert L. Morton and David A. Burton, having U.S. application Ser. No. 09/614,074, which is filed on the same date herewith and all of which is incorporated herein by reference in its entirety.

BACKGROUND OF THE INVENTION

1. Field of the Invention

The present invention relates to a method system, program, and data structures for configuring arrays in a storage device.

2. Description of the Related Art

A storage controller system-manages the input/output (I/O) requests from numerous host systems to a large storage space, such as a Direct Access Storage Device (DASD) comprised of numerous interconnected hard disk drives. The host systems view the storage space as a series of logical unit numbers (LUNs). For instance, with the Small Computer System Interface (SCSI), the host device driver would include the LUN number with the I/O request to access a logical block address (LBA) within the LUN. The storage controller maintains a mapping of LUNs to actual physical disks in the DASD. In this way, the storage controller maps the requested LBA in a LUN to a particular sector in a disk.

In prior art systems, the storage controller maintains configuration data indicating the mapping of LUN numbers to sectors in the disks in the DASD. The storage controller maintains a single map of LUNs to the physical storage space or storage subsystem that is used by all attached hosts. In this way all hosts use the same LUN numbers to refer to the same physical storage space via the storage controller. If an array of disks is removed, then the LUN numbers that previously mapped to that array would become NULL as the data is no longer present. If an array of disks are added to the DASD unit, then the storage controller would have increased physical storage space to use for future LUNs that the hosts create. However, any data and LUN configurations that were previously embedded in the disk array added to the DASD are lost because the storage controller does not maintain LUN mappings to a newly added array. Only upon receiving a request from a host to add a LUN would the storage controller then map a new LUN number to the new space in the added array.

There is a need in the art to provide an improved technique for managing the mapping of LUN numbers to physical storage space to provide greater flexibility in the use of the storage space.

SUMMARY OF THE PREFERRED EMBODIMENTS

To overcome the limitations in the prior art described above, preferred embodiments disclose a method, system, program, and data structures for mapping logical units to a storage space comprised of at least one array of storage units. Configuration information stored in one array indicating a first mapping of logical units to storage locations in the array is read. A second mapping of logical units to storage locations in multiple arrays is generated using the configuration information read from the array. Each logical unit is assigned to only one of the arrays.

In further embodiments, a request is received to add a logical unit that maps to a range of blocks in a target array. A determination is made of one logical unit available in the second mapping that does not map to a storage location in one array. The first mapping is modified to indicate that the determined logical unit maps to a range of blocks in the target array. Further, the second mapping is modified to indicate that the determined logical unit maps to the target array.

In still further embodiments, the configuration information for each array in the storage space is read. The second mapping is generated by determining, for each array, each logical unit in the first mapping that maps to a storage location in the array. The determined logical unit in the second mapping is used to map to the storage location in the array as indicated in the first mapping if the second mapping does not already use the determined logical unit to map to another array.

In certain embodiments, the configuration information is read from each array in response to a coldstart operation. Alternatively, the configuration information is read upon detecting a change in the arrays included in the storage space.

Preferred embodiments provide a logical unit number (LUN) configuration in the arrays so that the storage space, including multiple arrays, is configured using the configuration information maintained in the arrays themselves. In this way, the arrays are self-contained and defined storage entities. If an array is added to a storage space, then the configuration of that array, as stored in the array, is used to add the array's self-defined configuration to the storage space. Thus, the LUN configuration and data stored in the added array are accessible as part of the storage space.

BRIEF DESCRIPTION OF THE DRAWINGS

Referring now to the drawings in which like reference numbers represent corresponding parts throughout:

FIGS. 2, 3, and 4 illustrate data structures that maintain the LUN configuration information for an array of disks in accordance with preferred embodiments of the present invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
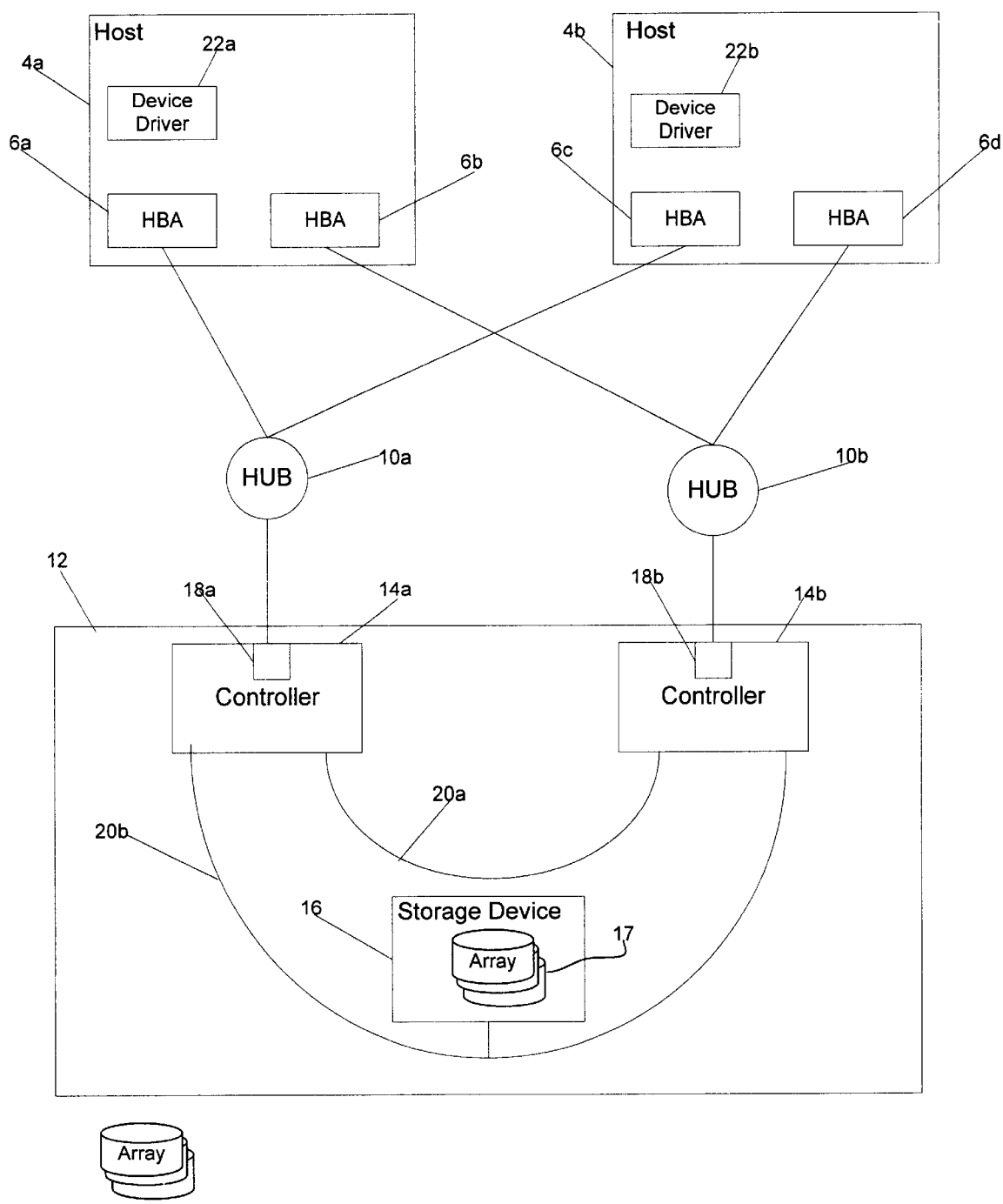
FIG. 1 is a block diagram illustrating a computing environment in which preferred embodiments are implemented.

FIG. 1 illustrates a computing environment in which preferred embodiments are implemented. Hosts 4a, b may comprise any computing device known in the art, including servers through which other client computers can access storage or clients. The hosts 4a, b each include two host bus adaptors (HBAs) 6a, b and 6c, d, respectively. The HBAs 6a, b, c, d may comprise a Fibre Channel or Small Computer System Interface (SCSI) adaptor card or any other network adaptor card known in the art. The HBAs 6a, b, c, d allow the hosts 4a, b to communicate with storage controllers 14a, b via the hubs 10a, b. The hubs 10a, b may comprise the IBM Fibre Channel Storage Hub or Switch, the IBM SAN Fibre Channel Switch, or any other switching device known in the art. A storage subsystem 12 includes two controllers 14a, b that provide access to a storage device 16, such as a DASD. Each controller 14a, b includes at least one port 18a, b, respectively, through which a host 4a, b accesses the controller 14a, b. In preferred implementations, both controllers 14a, b can access any storage location in the storage device 16. The controllers 14a, b may comprise the IBM Fibre Channel Raid Storage Controller or any other storage controller known in the art that provides one or more hosts access to a single storage space or storage devices. Lines 20a, b provide communication from the controllers 14a, b to the storage device 16 such that either controller 14a, b can use the lines 20a, b to access any part of the storage device 16. The lines 20a, b may be implemented using the Fibre Channel interface. In such case, the controllers 14a, b would include Fibre Channel adaptors and the lines 20a, b would comprise cables connected to the controllers 14a, b to form Fibre Channel arbitrated loops (FCAL) to interconnect the controllers 14a, b to the storage device 16 components, e.g., hard disk drives.

In alternative embodiments, multiple hosts may connect to a single storage controller that provides access to a DASD. Storage subsystems that provide access to multiple hosts include high end storage controllers, such as the IBM 3990 and Enterprise Storage Server storage controller products, as well as others. Thus, the term "storage controller" or "controller" as used herein refers to any storage controller, storage server, control unit, or any other computing device that manages input/output (I/O) requests from multiple host systems to a physical storage space.

Each host system 4a, b includes a device driver 22a, b which is used to detect new LUN assignments and issue commands to determine information on the LUNs. Preferred embodiments are implemented using the SCSI protocol. In such case, the controllers 14a, b would provide inquiry data for each LUN, including information concerning parameters of the controller 14a, b and the LUN for which the inquiry data is provided. The inquiry data includes an eight byte world wide serial number for the LUN that is unique across the world for that LUN.

In preferred embodiments, the storage device 16 is comprised of one or more arrays. Each array is comprised of one or more contiguous or non-contiguous disks. The disks within an array may be contained within a self-contained and movable housing, and capable of being removed and added to a storage device 16. In such case, the housing of the array would include a port to connect the array, and all its included disk drives, to the storage device 16 system. The disks in the array may be managed as a Redundant Array of Independent Disks (RAID), using RAID algorithms known in the art. In preferred embodiments, the storage space of each array forms contiguous sectors. The LUNs each map to one or more of the disks in a single array. In preferred embodiments, the LUNs comprise a set of contiguous sectors in a single array. Thus, different LUNs may map to different arrays.

To maintain the configuration and mapping of LUNs to physical disks in an array, three data structures are maintained by the controllers 14a, b, an array control block (ACB), a logical device control block (LDCB), and a LUN mapping array. FIG. 2 illustrates the data fields in an array control block 50. The array control block (ACB) 50 indicates the disks in the ACB and the total capacity in sectors of all the disks in the ACB. As discussed, the storage device 16 may be comprised of multiple array control blocks. The logical device control block (LDCB) is a data structure used to link a LUN to a particular sector within the array. FIG. 3 illustrates the data fields in a logical device control block (LDCB) 60. The LDCB 60 includes a pointer 62 to an array control block (ACB) and a LUN serial number 64 that maps into the array control block (ACB) addressed by the pointer 62. The LUN serial number may comprise the eight byte world wide number for the LUN. A capacity field 66 indicates the total sector capacity of the LUN within the array control block (ACB). A sector offset field 68 indicates the offset from the first sector in the storage space of the array control block (ACB) where the LUN identified in the LUN field 64 begins. A depth field 70 indicates the depth of a stripe on a disk in the array in sectors. Thus, in RAID arrays, the number of sectors equal to the depth is written on a disk before writing data to the next disk in the array to stripe sectors. The related and copending application entitled "Method, System, And Program For Expanding the Storage Space in an Array of Storage Units", having U.S. application Ser. No. 09/614,074 and which was incorporated by reference above, describes how to determine an array sector given a LUN number and a logical sector in the LUN using the information in the logical device control block (LDCB).

The storage controllers 14a, b maintain a global LUN mapping array (GLMA) that includes for each entry a LUN number and either a NULL value if the LUN number is not currently configured in the system or a pointer to the logical disk control block (LDCB) which provides information on the location in an array where the LUN is located. In this way, the storage controller 14a, b maintains a consistent view of LUN numbers across all arrays in the storage device 16 so that two identical LUN numbers are not used in different arrays in the storage device 16.

FIG. 4 illustrates the data fields in a LUN mapping array 80 which includes an entry for all possible LUN numbers used by the storage controller 14a, b. Each LUN number entry includes either a pointer to the logical disk control block (LDCB) that provides information on how that LUN maps to sectors within an array or a NULL value indicating that the LUN number does not map to an array in the storage device 16. Thus, for each array, there is an array control block (ACB) 50 and a LUN map 80 that maps all LUNs assigned to sectors in the array control block (ACB) to a logical device control block (LDCB) 60 which provides information on the location in the array control block (ACB) 50 space of each LUN.

In preferred embodiments, the array control block (ACB) 50, LUN mapping array 80, and all logical device control blocks (LDCBs) 60 listed in the LUN map 80 are stored in sectors within one or more disks of the array, which provides non-volatile storage of all the configuration information needed to map LUNs to locations in the array storage space.

In this way, each array is a self-contained storage system that includes self-defining configuration information on the LUNs that map into the array storage space. In preferred embodiments, the array configuration information (e.g., array control block 50, logical device control block (LDCBs) 60, and LUN mapping array 80) may be stored on multiple disks in the array using a RAID algorithm to provide further protection of the array configuration information in the event of a failure of one or more of the disks in the array.

In preferred embodiments, a storage controller, operating under control of firmware and/or software, would access the configuration data stored in the arrays, such as the array control block 50, logical device control blocks (LDCB) 60, and LUN mapping array 80, to configure the entire storage subsystem or storage space including the arrays. In a storage subsystem, the storage controller firmware and/or software may be implemented in a single controller that provides access to a storage device, e.g., DASD. Alternatively, the storage subsystem may comprise a dual controller system, such as that shown in FIG. 1. In dual controller systems, one storage controller 14a would function as a master and the other the slave, where the master performs configuration operations. If there is a failure at the master, then the slave would take control. Thus, both storage controllers 14a, b would include the firmware to perform the operations described in FIGS. 5–7.

Figure 5:
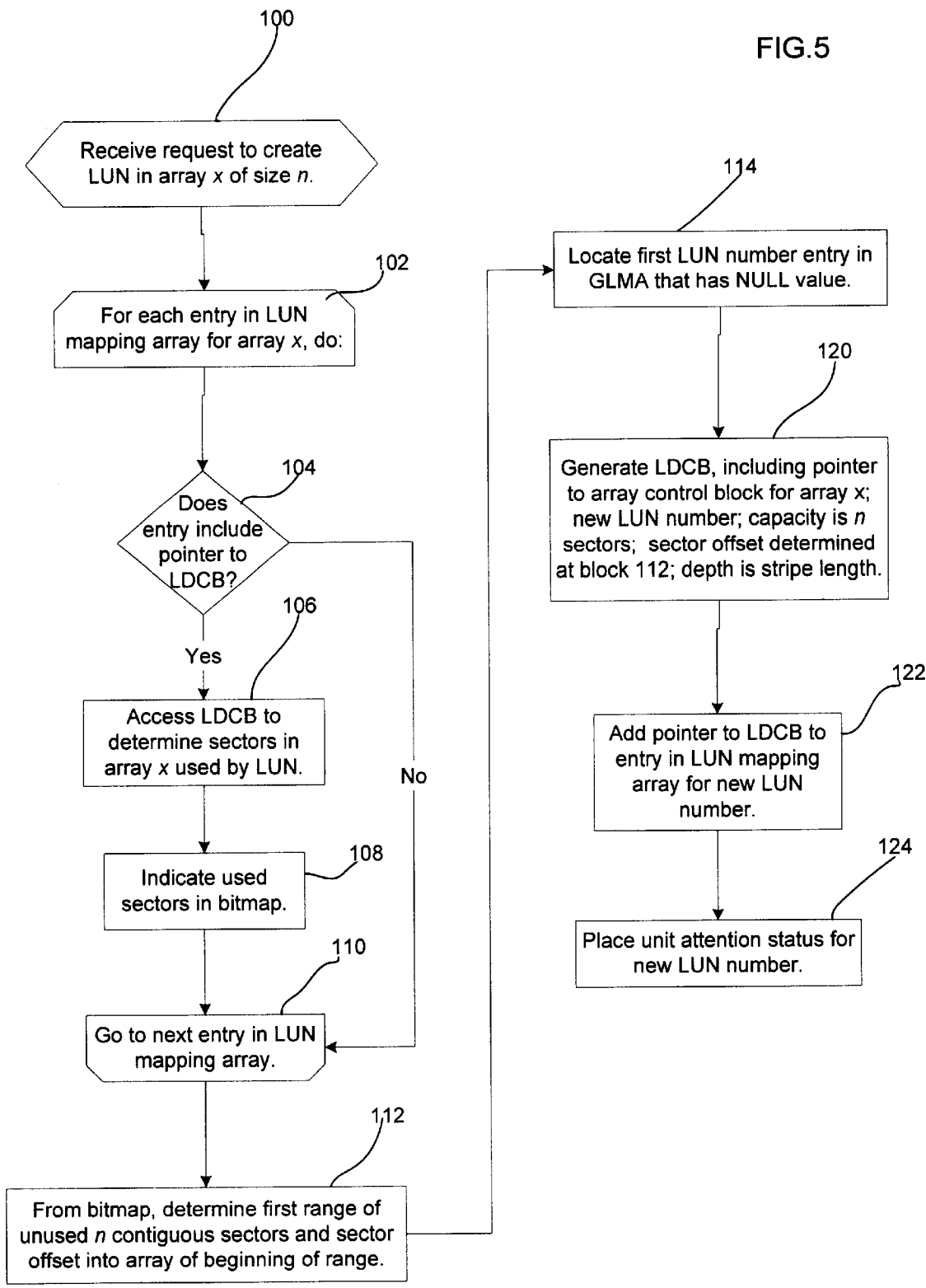
FIG. 5 illustrates logic implemented in a storage controller to add a LUN to an array in a storage subsystem in accordance with preferred embodiments of the present invention.

FIG. 5 illustrates logic implemented in firmware in the controllers 14a, b to add a LUN to an array x of size n in the storage device 16. A host system may include a configuration tool to request the controller 14a, b to add a LUN. Control begins at block 100 with the storage controller 14a, b receiving a request to create a LUN in array x of size n. For each entry i in the LUN mapping array of array x, the storage controller 14a, b performs the steps at block 104 to 108 to generate a bitmap or other data structure indicating the used and unused sectors in the array x. If (at block 104) the entry i includes a pointer to a logical device control block (LDCB), as opposed to a NULL value, then the storage controller 14a, b accesses (at block 106) the logical device control block (LDCB) to determine the sectors in array x used by the LUN. The storage controller 14a, b indicates (at block 108) the used sectors in a bitmap. At block 110, control proceeds back to block 102 to consider the next (i+1)th entry in the LUN mapping array x. If the entry i in the LUN mapping array 80 has the NULL value, then the storage controller would proceed to block 110 to consider the next (i+1)th entry. Thus, as a result of blocks 102 to 110, there is a bitmap table indicating ranges of sectors in the array x that are used for a particular LUN number.

From the bitmap, the storage controller 14a, b determines (at block 112) the first range of unused n contiguous sectors that can be used for the new LUN and the sector offset into the array x of the beginning of the range. From the LUN mapping array 80, the storage controller 14a, b locates (at block 114) the first LUN number entry in the global LUN mapping array (GLMA) having the NULL pointer, indicating a used LUN number in the storage device 16. The storage controller 14a, b then generates (at block 120) the logical disk control block (LDCB) including a pointer 62 to the array control block for array x; the capacity 66 is the total n sectors to include in the new LUN; a sector offset 68 into the array x is determined at block 112, i.e., the sector offset in the array x where the contiguous range of blocks for the new LUN begins. The depth 70 is the stripe depth on a disk. The storage controller 14a, b then adds a pointer (at block 122) to the generated LDCB in the LUN mapping array 80 for the new LUN number. A unit attention or asynchronous status is presented (at block 124) for the new LUN to cause the hosts 4a, b to request inquiry data on the new LUN to make the new LUN accessible to the hosts 4a,b.

Figure 6:
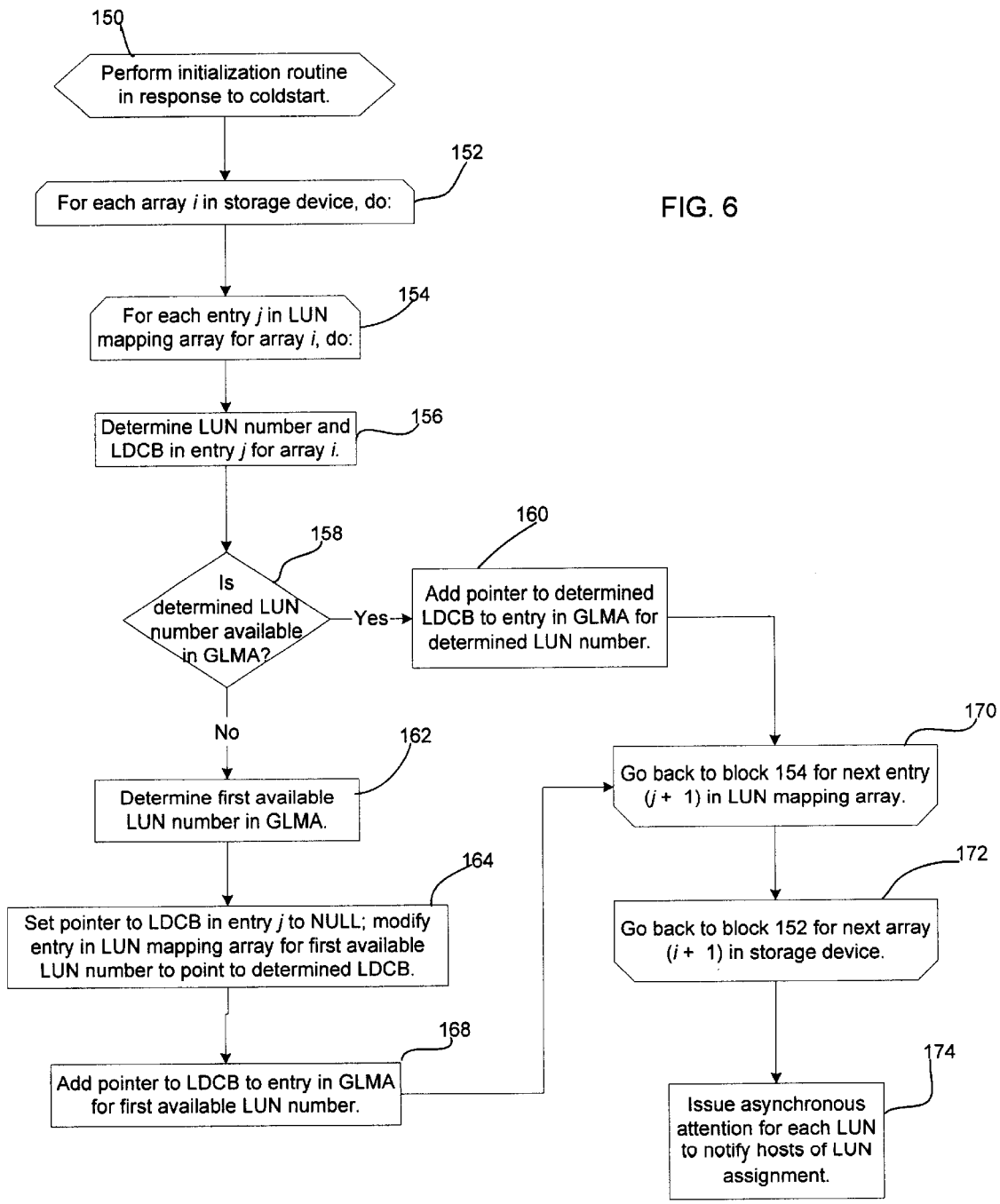
FIG. 6 illustrates logic implemented in a storage controller to determine the LUN configuration during a coldstart in accordance with preferred embodiments of the present invention.

FIG. 6 illustrates logic implemented in the firmware and/or software of the storage controllers 14a, b to initialize the global LUN mapping array (GLMA) from the data structures 50, 60, and 80 maintained in the configuration sectors of each array during a coldstart, i.e., initialization after a power-up. Control begins at block 150 with the storage controller 14a, b performing an initialization routine after a coldstart. The storage controller 14a, b performs a loop at block 152 to 170 for each array i in the storage device 16. For each array i in the storage device 16, the storage controller 14a, b performs an inner loop at blocks 154 through 168 for each entry j in the LUN mapping array 80 for array i. Within this inner loop, the storage controller 14a, b determines (at block 156) the LUN number and pointer to the logical disk control block (LDCB) for entry j in LUN i, which the storage controller 14a, b reads from one or more disks in the array. If (at block 158) the determined LUN number is available in the global LUN mapping array, i.e., has a NULL value, then the storage controller 14a, b adds (at block 160) a pointer to the determined logical disk control block (LDCB) to the entry in the global LUN mapping array (GLMA) for the determined LUN number to reserve that LUN number in the storage device 16 for that LDCB.

Otherwise, if the determined LUN number in entry j in the LUN mapping array 80 is not available, i.e., there already is a pointer to another LDCB, then the storage controller 14a, b determines (at block 162) the first available LUN number in the global LUN mapping array (GLMA). The storage controller 14a, b then sets (at block 164) the pointer to the LDCB for the determined LUN number in entry j of the LUN mapping array 80 to NULL, as this LUN number is already used by another array in the GLMA, and then modifies the entry in the LUN mapping array for array i for the first available LUN number to point to the determined logical device control block (LDCB). In this way, the LUN number array i previously used for the sectors specified in the determined LDCB is set to the first available LUN number that is not used by another array i in the global LUN mapping array (GLMA). The pointer to the modified LDCB is added (at block 168) to the entry in the global LUN mapping array (GLMA) for the first available LUN number. Control then proceeds (at block 170) back to block 154 to consider the next (i+1)th entry in the LUN mapping array 50 for array i. After considering all entries in the LUN mapping array for array i, control proceeds (at block 172) back to block 152 to consider the next (i+1)th array in the storage device 16. After initializing the global LUN mapping array (GLMA) with all the LUNs available from the arrays in the storage device 16, the storage device 16 issues a unit attention status for each LUN to notify the hosts of the GLMA LUN assignment.

With the logic of FIG. 6, the storage controller 14a, b obtains all the configuration data from configuration sectors in the arrays themselves. Thus, each array includes self-defining information to define the LUN configuration within the array. With this arrangement, if an array of disks is removed or added to the storage device 16 while the power to the storage controllers 14a, b is off, then upon initialization, the storage controller 14a, b will detect the configuration of any new arrays added to the storage device 16 from the self-defined configuration information, including the array control block 50, logical disk control blocks 60, and LUN mapping array 80, stored in the array. This allows an array to be added to the system and all the LUNs and data in the array to be accessible to the hosts 4a, b attached to the storage controller 14a, b.

Figure 7:
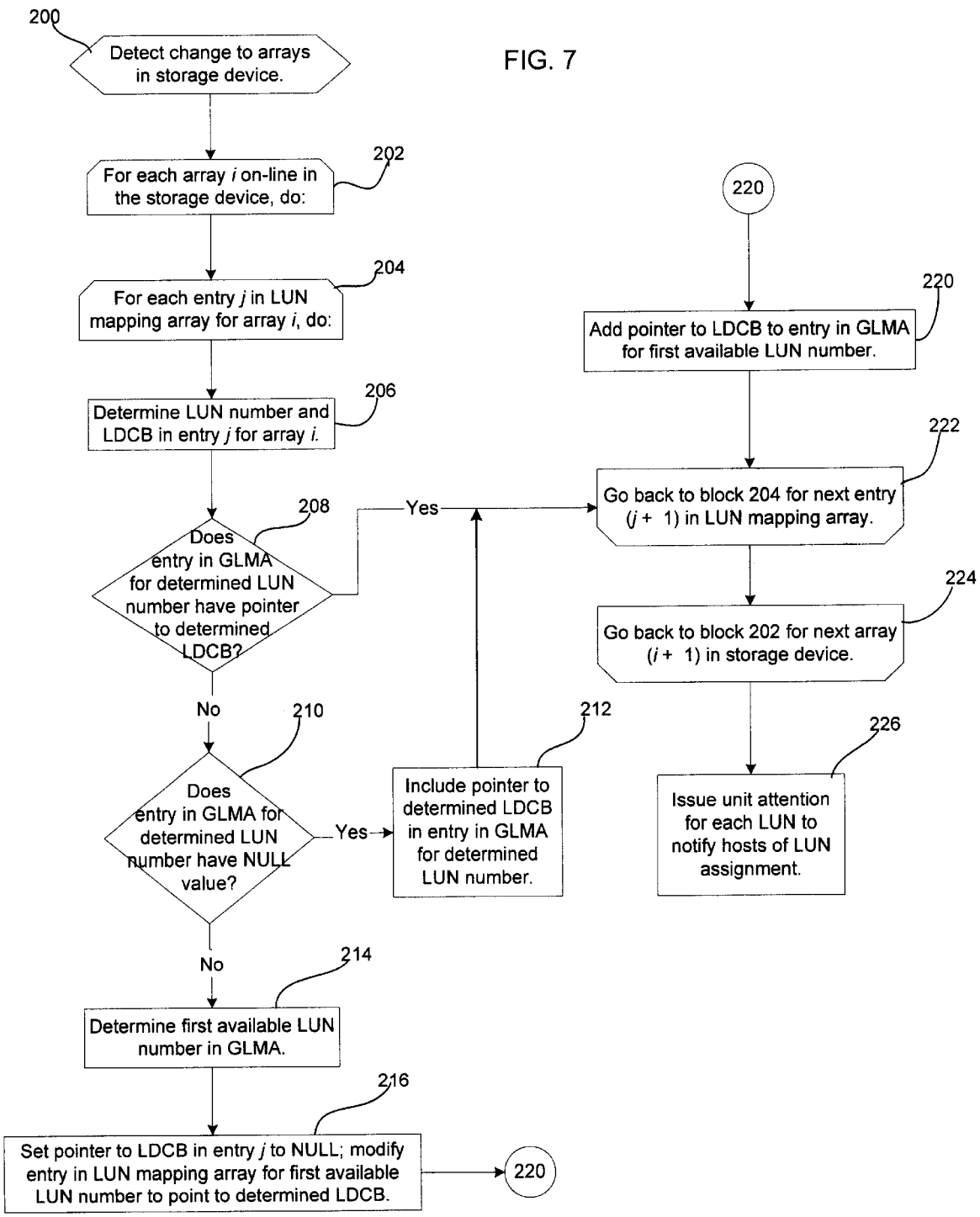
FIG. 7 illustrates logic implemented in a storage controller to determine the LUN configuration during a warmstart in accordance with preferred embodiments of the present invention.
Figure 8:
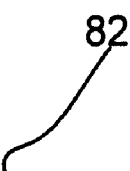
FIG. 8 illustrates a global LUN mapping array (GLMA) in accordance with preferred embodiments of the present invention.

FIG. 7 illustrates logic implemented in the storage controller to perform an initialization routine in response to a warmstart, which would occur in response to the removal or addition of an array to the storage device 16 while the controller 14a, b is on-line. Thus, an array of disks can be swapped in or out of the storage device 16, e.g., DASD, while the storage controller 14a, b is on-line. In response to this alteration of the arrays in the storage device 16, the storage controller 14a, b would proceed to block 200 to begin the warmstart process. The storage controller 14a, b then begins a loop at blocks 202 to 224 for each array i on-line in the storage device. For each array i, the storage controller 14a, b then processes each entry j in the LUN mapping array 80 for array i at block 206. Within this inner loop at blocks 204 to 220, the storage controller 14a, b determines the LUN number and logical disk control block (LDCB) in entry j of the LUN mapping array 80 for array i.

If (at block 208) the entry in the global LUN mapping array (GLMA) maintained by the storage controller 14a, b for the determined LUN number has a pointer to the determined logical disk control block (LDCB), then the determined LUN in the array i was configured in the storage controller 14a, b before the warmstart, and control proceeds (at block 208) back to block 222 to consider the next entry j in the LUN mapping array 80 for array i. If the entry in the global LUN mapping array (GLMA) for the determined LUN number does not have a pointer to the determined logical disk control block (LD,CB), then the storage controller 14a, b further determines (at block 210) whether the entry in the global LUN mapping array (GLMA) for the determined LUN number has a NULL value. If so, then the pointer to the determined logical disk control block (LDCB) is included (at block 212) in the entry in the global LUN mapping array (GLMA) for the determined LUN number and then control proceeds to block 222 to consider the next entry in the LUN mapping array 80.

Otherwise, if the entry in the global LUN mapping array (GLMA) already includes a pointer to a different LDCB, then that LUN number is being used by an array that was configured in the storage subsystem before the warmstart. In such case, the storage controller 14a, b determines (at block 214) the first available LUN number in the global LUN mapping array (GLMA), i.e., the entry having a NULL value. The storage controller 14a, b then sets (at block 216) the pointer in entry j in the LUN mapping array i to NULL, as the LUN number in this entry j is already used by another array in the GLMA, and modifies the entry in the LUN mapping array for array i for the first available LUN number to point to the determined logical device control block (LDCB). In this way, the LUN number array i previously used for the sectors specified in the determined LDCB is switched to another LUN number that is not configured in another array in the global LUN mapping array (GLMA). The pointer to the modified LDCB is added (at block 220) to the entry in the global LUTN mapping array (GLMA) for the first available LUTN number. Control then proceeds (at block 222) back to block 204 to consider the next (1+1)th entry in the LUN mapping array 50 for array i. After considering all entries in the LUN mapping array for array i, control proceeds (at block 224) back to block 202 to consider the next (i+1)th array in the storage device 16. After initializing the global LUN mapping array (GLMA) with all the LUNs available from all on-line arrays in the storage device 16, the storage controller 14a, b issues a unit attention status for each LUN added or removed to notify the hosts of the new LUN changes.

If the detected change was the removal of an array, then the storage controller 14a, b would have to verify that each current logical unit entry in the global LUN mapping array (GLMA) maps to an existing array, i.e., whether the pointer to the array control block 60 in the logical disk control block (LDCB) 60 is to a valid array. Thus, after detecting a change, the storage controller 14a, b would first determine all connected arrays. If an entry in the global LUN mapping array pointed to a non-existent array, then the LDCB pointer for that entry would be made NULL. After nullifying the pointers for all LUN entries in the global LUN mapping array (GLMA) that include a pointer to a logical device control block (LDCB) for the removed array, the storage controller 14a, b would then proceed to block 202 in FIG. 7 to verify the existing configuration.

With the logic of FIG. 7, an array of disks that have preexisting data and a LUN configuration may be plugged-into the storage device 16 so that the array LUN configurations added to the global LUN mapping array (GLMA) would be accessible to hosts 4a, b connected to the storage controller 14a, b. All the LUN configuration data for the array is maintained in the array sectors. Thus, when the array is plugged into the storage device 16, the array itself provides the LUN configuration information to the storage controller 14a, b to allow the array's LUNs to be added to the system. Further, with the preferred embodiments, arrays may be added and removed, and the changes are configured into the storage subsystem with a warmstart operation, without having to endure a coldstart.

Conclusion

The following describes some alternative embodiments for accomplishing the present invention.

The preferred embodiments may be implemented as a method, apparatus or program using standard programming and/or engineering techniques to produce software, firmware, hardware, or any combination thereof. The code and instructions in which the preferred embodiments are implemented are accessible from and embedded in an information bearing medium, which may comprise one or more computer-readable devices, firmware, programmable logic, memory devices (e.g., EEPROMs, ROMs, PROMs, RAMs, SRAMs, etc.), hardware, electronic devices, a computer readable magnetic storage unit, CD-ROM, a file server providing access to the programs via a network transmission-line, wireless transmission media, signals propagating through space, radio waves, infrared signals, etc. Of course, those skilled in the art will recognize that many modifications may be made to this configuration without departing from the scope of the present invention.

In preferred embodiments, the storage subsystem 12 included two controllers 14a, b and one port 18a, b on each controller. In further embodiments, the subsystem 12 may include more than two controllers and more than one port on each controller. Further, there may be more than one path from any one host to each controller.

The preferred logic of FIGS. 5–7 describes specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

Preferred embodiments described particular counters, data structures and algorithms for providing self-defining configuration information in an array that can be used to configure the storage controller to add the array to the storage subsystem. In alternative embodiments, different data structures and algorithms may be used to provide the self-defining configuration information in the array.

In preferred embodiments, the storage device comprised disk arrays, such as a DASD, where the arrays comprised hard disk drives. In alternative embodiments, the portable and self-contained arrays may contain non-volatile storage medium other than hard disk drives, such as optical disks, tapes, etc.

In preferred embodiments, the hosts view the storage space as a series of LUN numbers. In alternative embodiments, logical units and techniques other than LUNs may be used to provide host systems a logical view of the storage space.

Preferred embodiments were described with respect to SCSI commands, such as the SCSI inquiry command used to obtain inquiry data from a SCSI server. In non-SCSI embodiments, different commands may be used to obtain the inquiry data for a LUN. In such case, the format of the inquiry data the controllers return may differ.

In summary, preferred embodiments disclose a method, system, program, and data structures for mapping logical units to a storage space comprised of at least one array of storage units. Configuration information stored in one array indicating a first mapping of logical units to storage locations in the array is read. A second mapping of logical units to storage locations in multiple arrays is generated using the configuration information read from the array. Each logical unit is assigned to only one of the arrays.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for mapping logical units to a storage space comprised of at least one array of storage units, comprising:
   reading configuration information stored in one array indicating a first mapping of logical units to storage locations in the array; and
   generating a second mapping of logical units to storage locations in multiple arrays by processing the configuration information read from the array, wherein each logical unit is assigned to only one of the arrays.

2. The method of claim 1, further comprising:
   receiving a request to add a logical unit that maps to a range of blocks in a target array;
   determining one logical unit in the second mapping that does not map to a storage location in one array;
   modifying the first mapping to indicate that the determined logical unit maps to a range of blocks in the target array; and
   modifying the second mapping to indicate that the determined logical unit maps to the target array.

3. The method of claim 1, further comprising:
   reading the configuration information for each array in the storage space, wherein generating the second mapping further comprises:
      for each array, determining each logical unit in the first mapping that maps to a storage location in the array; and
      assigning the determined logical unit in the second mapping to map to the storage location in the array as indicated in the first mapping if the second mapping does not already assign the determined logical unit to map to another array.

4. The method of claim 3, wherein generating the second mapping further comprises:
   assigning an unassigned logical unit in the second mapping to map to the storage location in the array if the second mapping assigns the determined logical unit from the first mapping to map to a storage location in another array.

5. The method of claim 4, further comprising:
   modifying the first mapping to indicate that the assigned logical unit maps to the storage location and that the determined logical unit does not map to the storage location if the second mapping assigns the determined logical unit to map to another array.

6. The method of claim 3, wherein the configuration information is read from each array in response to a coldstart operation, further comprising setting the values in the second mapping for each assigned logical unit.

7. The method of claim 3, further comprising:
   detecting a change in the arrays included in the storage space, wherein the configuration information is read from each array in response to detecting the change.

8. The method of claim 7, wherein the determined logical unit in the first mapping is assigned to map to the storage location in the array if the second mapping already assigns the determined logical unit to map to the storage location in the array.

9. The method of claim 8, further comprising assigning an unassigned logical unit in the second mapping to map to the storage location in the array if the second mapping assigns the determined logical unit from the first mapping to map to a storage location in another array.

10. The method of claim 7, wherein the change to the arrays comprises the removal of at least one array from the storage space, further comprising:
    modifying the second mapping to indicate that logical units that map to storage locations in each removed array no longer map to the storage locations in each removed array.

11. The method of claim 1, wherein the first mapping comprises: (i) a control block for each logical unit that maps to a storage location in the array indicating the logical unit and storage location in the array assigned to the logical unit and (ii) a logical unit mapping of logical units to control blocks, and wherein generating the second mapping further comprises:
    adding the control blocks to the second mapping to associate each assigned logical unit with one control block, wherein the logical unit in the control block is the same as the logical unit associated with the control block in the first mapping.

12. A system for mapping logical units, comprising:
    a storage space comprised of at least one array of storage units;
    means for reading configuration information stored in one array indicating a first mapping of logical units to storage locations in the array; and means for generating a second mapping of logical units to storage locations in multiple arrays by processing the configuration information read from the array, wherein each logical unit is assigned to only one of the arrays.

13. The system of claim 12, further comprising:
means for receiving a request to add a logical unit that maps to a range of blocks in a target array;
means for determining one logical unit in the second mapping that does not map to a storage location in one array;
means for modifying the first mapping to indicate that the determined logical unit maps to a range of blocks in the target array; and
means for modifying the second mapping to indicate that the determined logical unit maps to the target array.

14. The system of claim 12, further comprising:
means for reading the configuration information for each array in the storage space, wherein the means for generating the second mapping further comprises:
for each array, determining each logical unit in the first mapping that maps to a storage location in the array; and
assigning the determined logical unit in the second mapping to map to the storage location in the array as indicated in the first mapping if the second mapping does not already assign the determined logical unit to map to another array.

15. The system of claim 14, wherein the means for generating the second mapping further comprises:
assigning an unassigned logical unit in the second mapping to map to the storage location in the array if the second mapping assigns the determined logical unit from the first mapping to map to a storage location in another array.

16. The system of claim 15, further comprising:
means for modifying the first mapping to indicate that the assigned logical unit maps to the storage location and that the determined logical unit does not map to the storage location if the second mapping assigns the determined logical unit to map to another array.

17. The system of claim 14, wherein the configuration information is read from each array in response to a coldstart operation, further comprising means for setting the values in the second mapping for each assigned logical unit.

18. The system of claim 14, further comprising:
means for detecting a change in the arrays included in the storage space, wherein the configuration information is read from each array in response to detecting the change.

19. The system of claim 18, wherein the determined logical unit in the first mapping is assigned to map to the storage location in the array if the second mapping already assigns the determined logical unit to map to the storage location in the array.

20. The system of claim 19, further comprising means for assigning an unassigned logical unit in the second mapping to map to the storage location in the array if the second mapping assigns the determined logical unit from the first mapping to map to a storage location in another array.

21. The system of claim 18, wherein the change to the arrays comprises the removal of at least one array from the storage space, further comprising:
means for modifying the second mapping to indicate that logical units that map to storage locations in each removed array no longer map to the storage locations in each removed array.

22. The system of claim 12, wherein the first mapping comprises: (i) a control block for each logical unit that maps to a storage location in the array indicating the logical unit and storage location in the array assigned to the logical unit and (ii) a logical unit mapping of logical units to control blocks, and wherein generating the second mapping further comprises:
adding the control blocks to the second mapping to associate each assigned logical unit with one control block, wherein the logical unit in the control block is the same as the logical unit associated with the control block in the first mapping.

23. An electronically accessible information bearing medium including code for use in mapping logical units to a storage space comprised of at least one array of storage units, wherein the code causes a processor to perform:
reading configuration information stored in one array indicating a first mapping of logical units to storage locations in the array; and
generating a second mapping of logical units to storage locations in multiple arrays by processing the configuration information read from the array, wherein each logical unit is assigned to only one of the arrays.

24. The information bearing medium of claim 23, wherein the code further causes the processor to perform:
receiving a request to add a logical unit that maps to a range of blocks in a target array;
determining one logical unit in the second mapping that does not map to a storage location in one array;
modifying the first mapping to indicate that the determined logical unit maps to a range of blocks in the target array; and
modifying the second mapping to indicate that the determined logical unit maps to the target array.

25. The information bearing medium of claim 23, wherein the code further causes the processor to perform:
reading the configuration information for each array in the storage space, wherein generating the second mapping further comprises:
for each array, determining each logical unit in the first mapping that maps to a storage location in the array; and
assigning the determined logical unit in the second mapping to map to the storage location in the array as indicated in the first mapping if the second mapping does not already assign the determined logical unit to map to another array.

26. The information bearing medium of claim 25, wherein generating the second mapping further comprises:
assigning an unassigned logical unit in the second mapping to map to the storage location in the array if the second mapping assigns the determined logical unit from the first mapping to map to a storage location in another array.

27. The information bearing medium of claim 26, wherein the code further causes the processor to perform:
modifying the first mapping to indicate that the assigned logical unit maps to the storage location and that the determined logical unit does not map to the storage location if the second mapping assigns the determined logical unit to map to another array.

28. The information bearing medium of claim 25, wherein the configuration information is read from each array in response to a coldstart operation, and wherein the code further causes the processor to perform setting the values in the second mapping for each assigned logical unit.

29. The information bearing medium of claim 25, wherein the code further causes the processor to perform:

detecting a change in the arrays included in the storage space, wherein the configuration information is read from each array in response to detecting the change.

30. The information bearing medium of claim 29, wherein the determined logical unit in the first mapping is used to map to the storage location in the array if the second mapping already assigns the determined logical unit to map to the storage location in the array.

31. The information bearing medium of claim 30, wherein the code further causes the processor to perform assigning an unassigned logical unit in the second mapping to map to the storage location in the array if the second mapping assigns the determined logical unit from the first mapping to map to a storage location in another array.

32. The information bearing medium of claim 29, wherein the change to the arrays comprises the removal of at least one array from the storage space, and wherein the code further causes the processor to perform:

modifying the second mapping to indicate that logical units that map to storage locations in each removed array no longer map to the storage locations in each removed array.

33. The information bearing medium of claim 23, wherein the first mapping comprises: (i) a control block for each logical unit that maps to a storage location in the array indicating the logical unit and storage location in the array assigned to the logical unit and (ii) a logical unit mapping of logical units to control blocks, and wherein generating the second mapping further comprises:

adding the control blocks to the second mapping to associate each assigned logical unit with one control block, wherein the logical unit in the control block is the same as the logical unit associated with the control block in the first mapping.

34. A computer readable storage array for adding to a storage device accessible to a controller, wherein the storage array includes configuration information indicating a first mapping of logical units to storage locations in the array, wherein the controller generates a second mapping of logical units to storage locations in multiple arrays by processing the configuration information read from the array, wherein each logical unit is assigned to only one of the arrays.

35. The storage array of claim 34, further comprising multiple storage arrays, each including configuration information indicating a first mapping of logical units to storage locations in the array, wherein the controller reads the configuration information for each array in the storage space and generates the second mapping by determining, for each array, each logical unit in the first mapping that maps to a storage location in the array and by assigning the determined logical unit in the second mapping to map to the storage location in the array as indicated in the first mapping if the second mapping does not already assign the determined logical unit to map to another array.

36. The storage array of claim 34, wherein an assigned logical unit in the second mapping is assigned to map to the storage location in the array if the second mapping assigns the determined logical unit from the first mapping to map to a storage location another array.

37. The storage array of claim 36, wherein the first mapping is modified to indicate that the assigned logical unit maps to the storage location and that the determined logical unit does not map to the storage location if the second mapping assigns the determined logical unit to map to another array.

38. The storage array of claim 34, wherein the first mapping comprises: (i) a control block for each logical unit that maps to a storage location in the array indicating the logical unit and storage location in the array assigned to the logical unit and (ii) a logical unit mapping of logical units to control blocks, and wherein the second mapping is generated by adding the control blocks to the second mapping to associate each assigned logical unit with one control block, wherein the logical unit in the control block is the same as the logical unit associated with the control block in the first mapping.

* * * * *